(12) United States Patent
Soares et al.

(10) Patent No.: US 6,603,075 B1
(45) Date of Patent: Aug. 5, 2003

(54) VERTICAL BUS POWER CONNECTOR

(75) Inventors: Gilbert Anthony Soares, Meban, NC (US); Richard Emery Bernier, Mebane, NC (US); James Brown Hestetune, Burlington, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/742,478

(22) Filed: Dec. 20, 2000

(51) Int. Cl.[7] ................................................ H01B 1/00
(52) U.S. Cl. .................. 174/72 B; 174/68.1; 174/68.2; 174/71 B; 174/70 B; 174/99 B; 174/149 B
(58) Field of Search ................. 174/72 B, 68.1, 174/68.2, 70 R, 71 R, 71 B, 70 B, 99 B, 149 B

(56) References Cited

U.S. PATENT DOCUMENTS

| | | | | |
|---|---|---|---|---|
| 2,953,771 A | * | 9/1960 | Kussy | 439/791 |
| 4,025,747 A | | 5/1977 | Bharteey et al. | |
| 4,077,687 A | * | 3/1978 | Farag | 339/64 M |
| 4,621,303 A | * | 11/1986 | Rowe | 361/338 |
| 4,734,041 A | * | 3/1988 | Bruchmann et al. | 439/637 |
| 4,758,536 A | * | 7/1988 | Miller et al. | 439/138 |
| 4,789,344 A | | 12/1988 | Fritsch et al. | |
| 4,845,589 A | * | 7/1989 | Weidler et al. | 361/342 |
| 5,157,584 A | | 10/1992 | Rowe | |
| 5,510,960 A | | 4/1996 | Rosen | |
| 5,515,236 A | | 5/1996 | Nolan et al. | |
| 5,752,855 A | * | 5/1998 | Mehez et al. | 439/610 |
| 5,969,938 A | | 10/1999 | Byrne et al. | |
| 5,989,073 A | * | 11/1999 | Kahoun | 439/651 |
| 6,051,782 A | * | 4/2000 | Wagner | 174/52.1 |
| 6,205,019 B1 | * | 3/2001 | Krom | 361/637 |
| 6,280,216 B1 | * | 8/2001 | Bernier et al. | 439/251 |

* cited by examiner

Primary Examiner—Dean A. Reichard
Assistant Examiner—Jinhee J Lee
(74) Attorney, Agent, or Firm—Cantor Colburn LLP

(57) ABSTRACT

A universal electrical connector is incorporated into the electric power distribution network of a motor control center, switchboard, or switchgear between vertical bus conductors and the power line inlet. The connector in the form of substantially a single metal casting is configured to connect the power line with the control center internal electrical distribution conductors without requiring additional connectors.

13 Claims, 6 Drawing Sheets

VERTICAL BUS POWER CONNECTOR

BACKGROUND OF THE INVENTION

The present invention relates to electrical connectors and more particularly relates to an electrical connector for attaching to a vertical bus bar.

Motor control centers perform various protection and control functions in industrial settings. In such motor control centers, three-phase electric power is fed from main conductors in electric power distribution mains (mains) to the motor control center. Within the motor control center housing, internal electric power is fed from the mains to the horizontal and vertical bus conductors (bus bars). Electrical power is fed through the bus bars to internal electrical components mounted within drawers or buckets, which slide in and out of the motor control center housing. The buckets contain electrical components such as one or more circuit breakers, starters, overload protectors, or pilot devices.

Horizontal bus bars, which are typically positioned in the upper or lower section of the control center cabinets, are arranged within the motor control center to connect the vertical bus bars. Each vertical bus bar forms a plane substantially perpendicular to the back wall of the motor control center for electrical connection to a power inlet from the mains and for carrying current to the electrical components that are arranged in the buckets. Each bucket has a plurality of stabs extending from the back of the bucket for electrically connecting the electrical components within the bucket with the vertical bus bar. Each stab includes opposing prongs biased toward each other to contact either side of a bus bar, whereby the electrical connection with the bus bar. In addition, the connection between the buckets and the bus bars can be accomplished using clips, which slidably accept the bus bars.

There is a need, however, for a strong and simple apparatus to connect incoming power cables with a vertical bus bar arrangement within a motor control center. Typically, a phase barrier is disposed between each power cable phase to prevent short circuiting by one phase coming in contact with another. The three phase power cables need to be connected securely to the vertical bus bars regardless of whether a phase barrier arrangement is used or not and strong enough to withstand levels and the tendency for devices to disengage at higher amperage readings without the need for excessive hardware.

BRIEF SUMMARY OF THE INVENTION

The above needs are filled by providing in a motor control center, or alternatively, in either a switch gear or switchboard, an electrical connector electrically connecting a bus bar to a power source comprising a main body portion having a first end and a second end, a base plate disposed substantially perpendicular to said first end of the body portion and secured to the base plate. The base portion is electrically connected to least one lug. The electrical connector further comprises a U-shaped member attached to the second end of the main body portion and includes legs configured to engage the bus bar through which an electrical contact can be made for supplying electrical current to the bus bar.

DETAILED DESCRIPTION OF THE INVENTION

Figure 1:
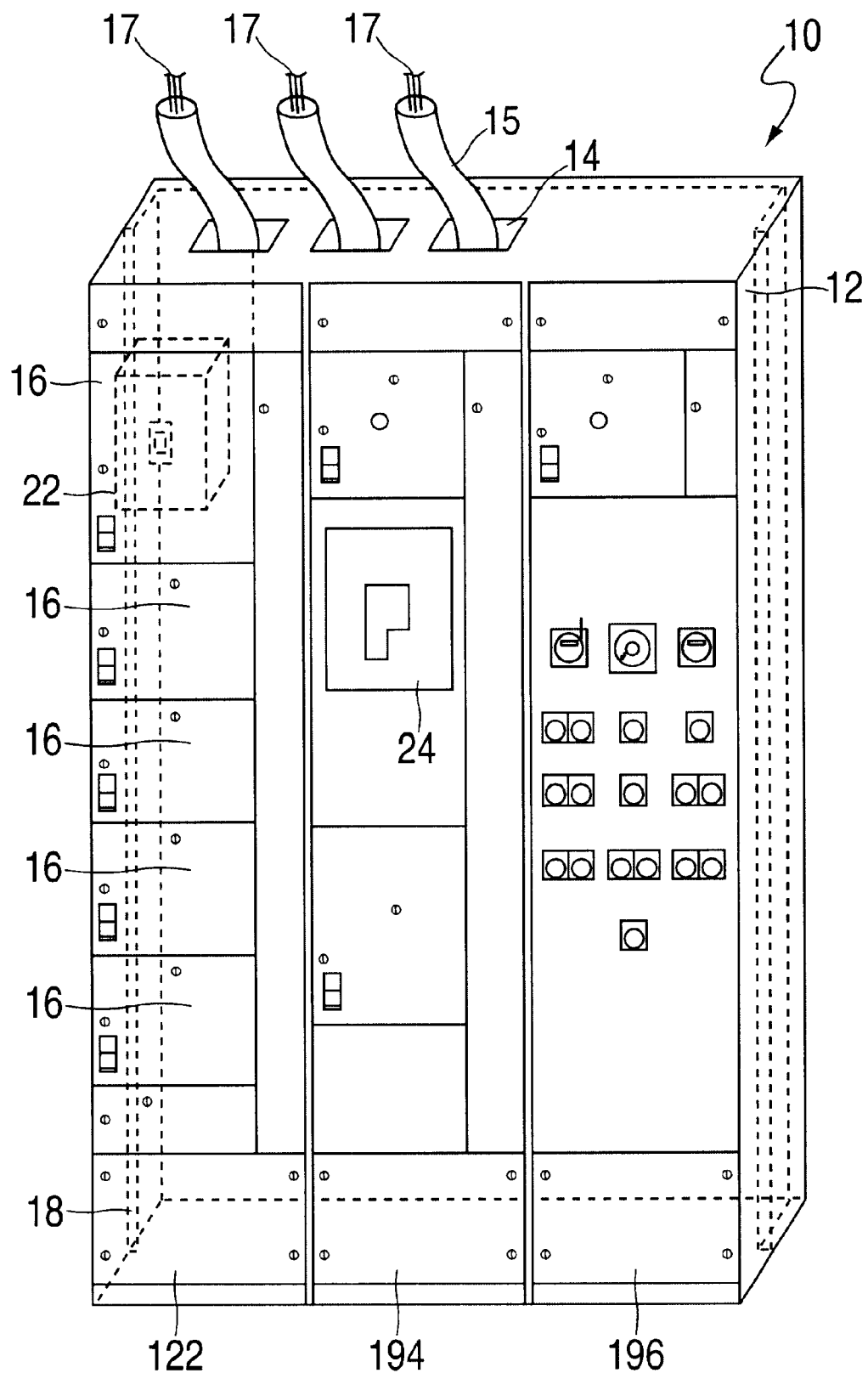
FIG. 1 is a front perspective view of a motor control center.

In an exemplary embodiment and referring now to FIG. 1, a motor control center 10 is illustrated. An enclosure cabinet 12 receiving electrical current includes openings 14 to accept incoming power cables 15. A plurality of drawers or buckets 16 is also included within cabinet 12. Buckets 16 contain various electrical components (not shown) such as one or more circuit breakers, starters, overload protectors, or pilot devices. A wing plate 18 (shown by phantom lines) is vertically disposed at the rear portion of cabinet 12. Wing plate 18 can be disposed across the entire rear portion of cabinet 12 or a portion thereof. It will be appreciated by one skilled in the art that the incoming power cables 15 may be arranged to enter a lower portion of cabinet 12 (FIG. 2) and that the specific configuration of wing plate 18 and various buses thereon may differ depending on the specific design needs. Horizontal or vertical main bus bars (not shown) are located within cabinet 12. Electrical components within buckets 16 are generally protected by one or more circuit breakers 22.

Figure 2:
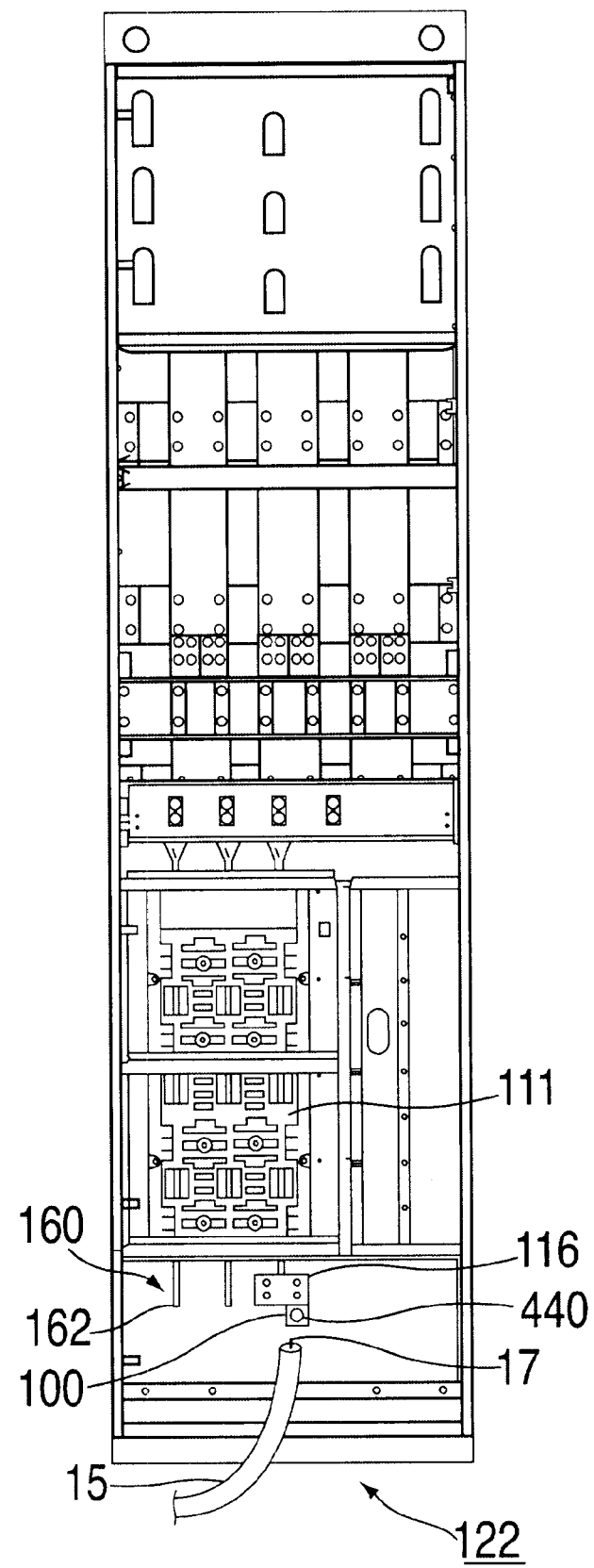
FIG. 2 is a front plan view of the vertical bus barrier within one section of a motor control line up.

Turning to FIG. 2, a vertical bus barrier 111 is shown within one section of motor control center 10. Vertical bus barrier 111 is used to insulate the vertical bus bars 160, three shown, from buckets 16 that slide into the cabinets. Typically, the vertical bus bars 160 are substantially flat, having a rectangular cross-sectional shape, and having slim profile while exposed through the barrier 111 as shown at 162 where connection is made to incoming power cables 15. That is, the thickness of the vertical bus bars 160 is shown at 162. FIG. 2 depicts one incoming power cable 15 having power cable conductor 17 received in hole 440 of a lug 100 and fixed to the lug with a setscrew (not shown). The lug 100 is attached to a face plate 116 that is attached to the vertical bus power connector (not shown) electrically connecting the power cable 15 to a vertical bus bar 160.

Figure 3:
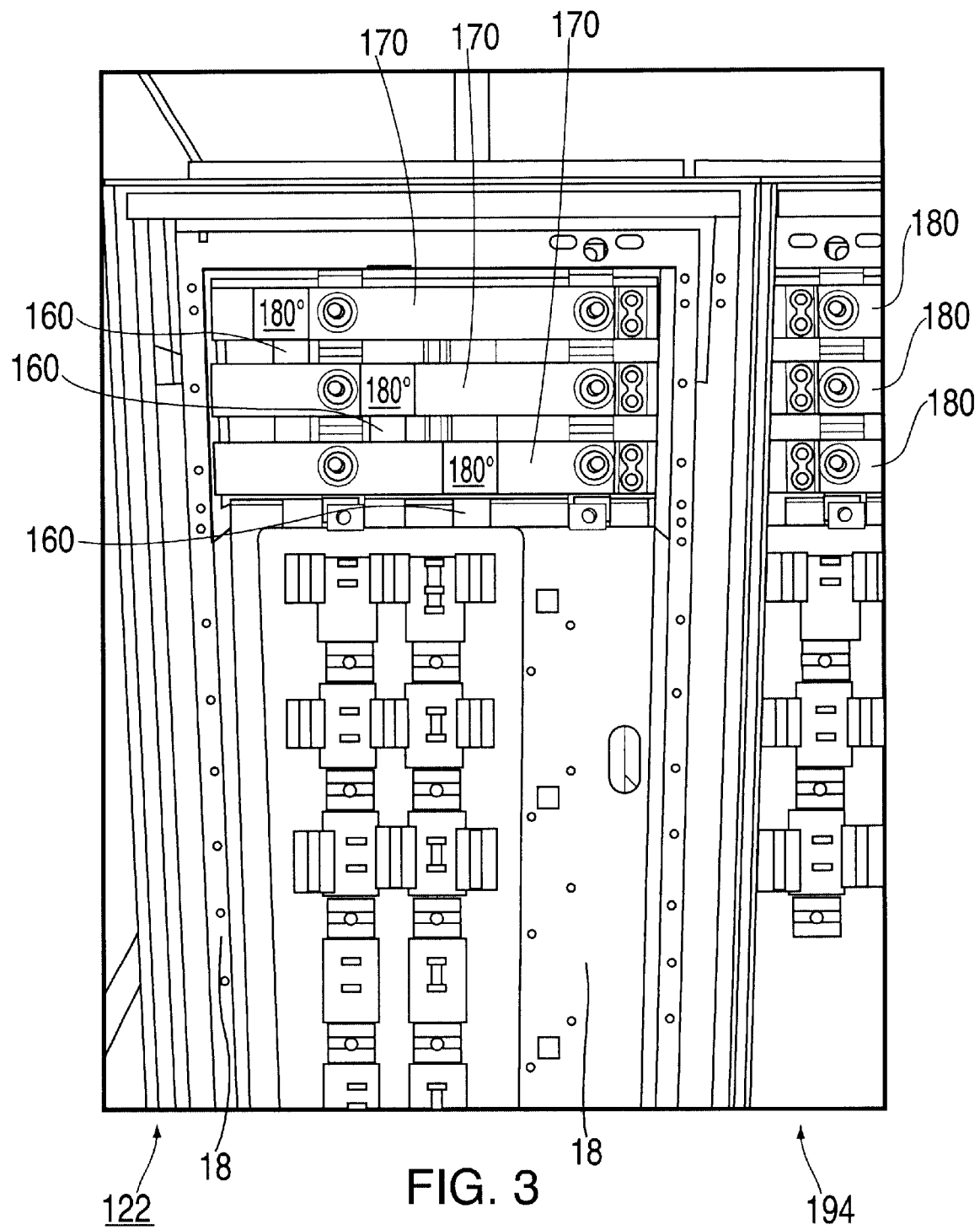
FIG. 3 is a front plan view showing horizontal and vertical bus bars with respect to the bus barriers.

FIG. 3 shows horizontal and vertical bus bars 170 and 160 within section 122 of motor control center 10. It can be seen that one vertical bus bar 160 is bolted to each horizontal bus bar 170 at connecting sections 180.

Figure 4:
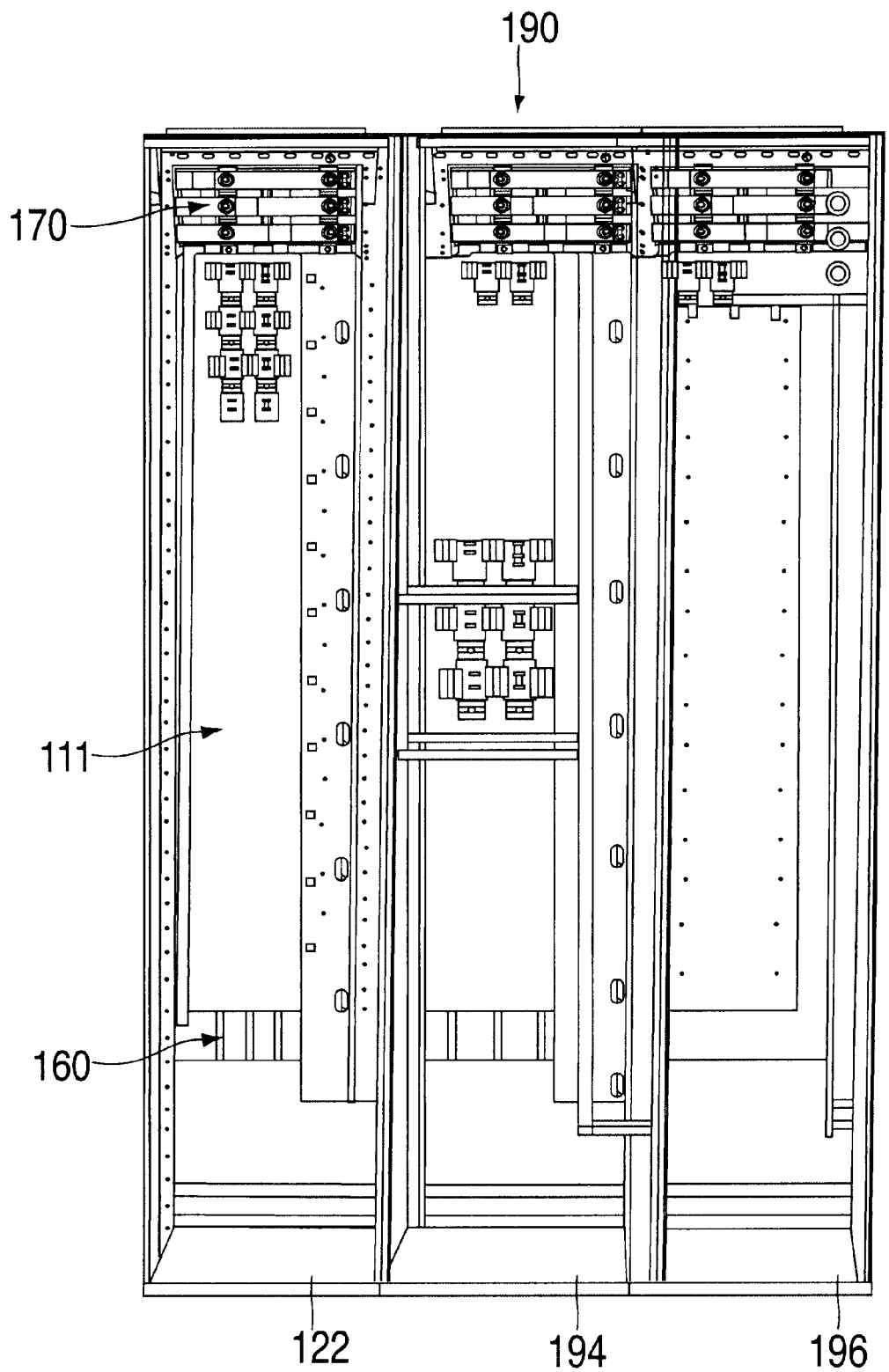
FIG. 4 is a front plan view of a three-section motor control line up.

FIG. 4 shows three sections 122, 194 and 196 of motor control center 10. motor control line-up 190. Vertical bus bars 160 are shown only in sections 122 and 194, not in section 196. The horizontal bus bars 170, however, pass through all three sections 122, 194 and 196 electrically connecting the vertical bus bars 160 from section 122 and 194. The flow of electrical current is from incoming cables (FIG. 2) to the vertical bus bar connectors to the vertical bus bars 160 in section 122 to the horizontal bus bars 170 at connecting sections 180. The electrical current then proceeds from horizontal bus bars 170 to vertical bus bars 160 in sections 194 and 196 and then to electrical components mounted within buckets 16 (not shown).

Figure 5:
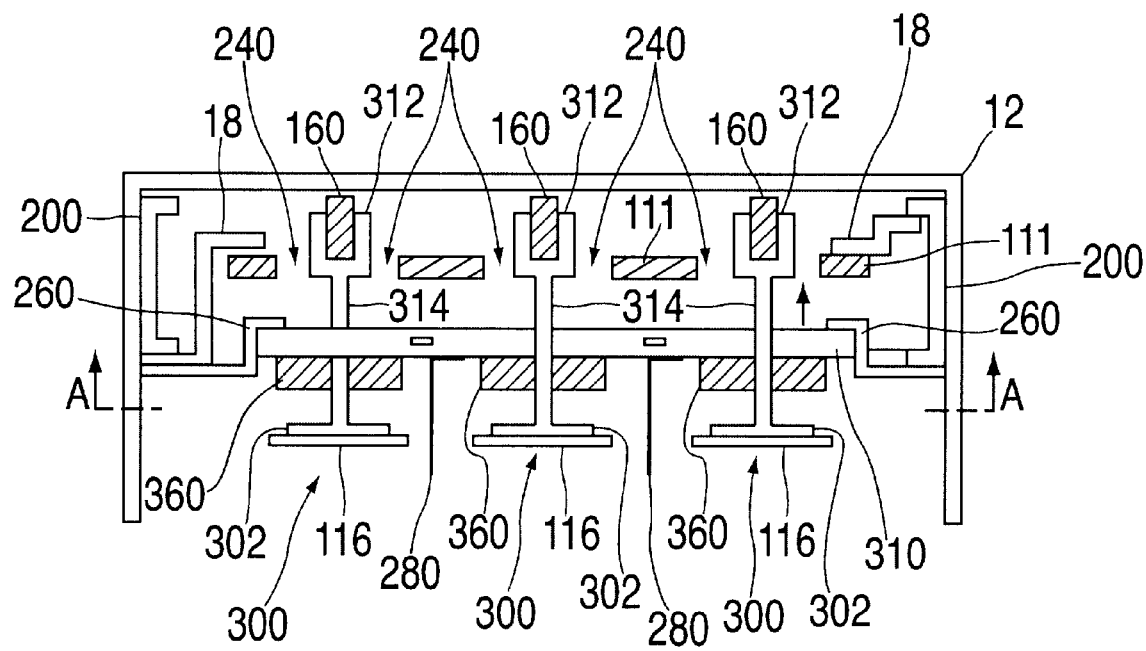
FIG. 5 is top view of a vertical bus power connector.

FIG. 5 shows a top view of a vertical bus bar connector 300. A C-shaped wing plate 200 is disposed on either side of cabinet 12. One end of each left and right wing plate 18 is attached to C-shaped wing plate 200 towards the rear of cabinet 12, and a vertical bus barrier 111 is connected to wing plates 18 at the opposite end. The bus barrier 111 has cutouts 240 to allow a U-shaped member 312 at one end of the bus bar connector 300 to pass through. Three vertical bus bars 160 representing three phases of a power distribution system are disposed along a vertical length inside cabinet 12 and each vertical bus bar 160 is coupled to the U-shaped member 312 of a bus bar connector 300. The U-shaped member 312 receives bus bar 160 such that legs 324, 326 (FIG. 7) forming either side of inner portion of U-shaped member 312 are disposed on, and form an electrical connection with opposing sides of bus bar 160. The bus bar connector 300 extends through the cutout 240 in the vertical bus barrier 111 and then through an opening 322 in an insulative barrier 310 that is disposed on wing plates 260, which in turn are disposed on the C-shaped wing plates 200. Phase barriers 280 are perpendicularly disposed on the insulative barrier 310 between the bus bar connectors 300 and extend to the front of cabinet 12 to prevent any potential short circuit between the phases. A main body portion 314 of bus bar connector 300 extends from U-shaped member 312 towards the front of cabinet 12 through vertical bus barrier 111 cutouts 240 and the openings 322 in the insulative barrier 310. Main body portion 314 is substantially rectangularly shaped. It should be noted that the core of a current transformer 360 for each phase may be mounted on the insulative barrier 310 surrounding each bus bar connector 300, as shown, thus allowing the detection of current flow in each of the phases. At the other end of a bus bar connector 300, a base plate 302 is disposed on main body portion 314 and perpendicularly oriented to the main body portion 314. The base plate 302 comprises at least one opening for attaching either or both a face plate 116 and at least one lug (not shown).

Figure 6:
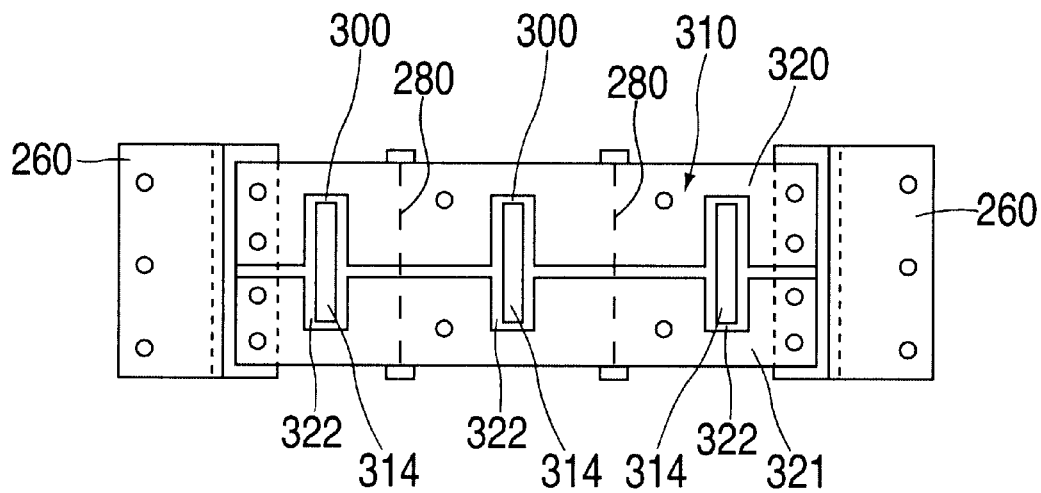
FIG. 6 is a cross section view of a vertical bus power connector in FIG. 5, Section A—A.

Referring to FIG. 6, the insulative barrier 310 is formed from two pieces 320, 321 with each piece having an opening 322 to receive the main body portion 314 of the bus bar connector 300. The insulative barrier 310 is formed from a two-piece assembly to allow the insulative barrier 310 to be installed onto the cabinet 12 after connectors 300 have been secured to vertical bus bars 160. FIG. 6 also shows the insulative barrier 310 mounted to wing plates 260 and having phase barriers 280 (phantom lines) perpendicularly attached to separate each phase.

Figure 7:
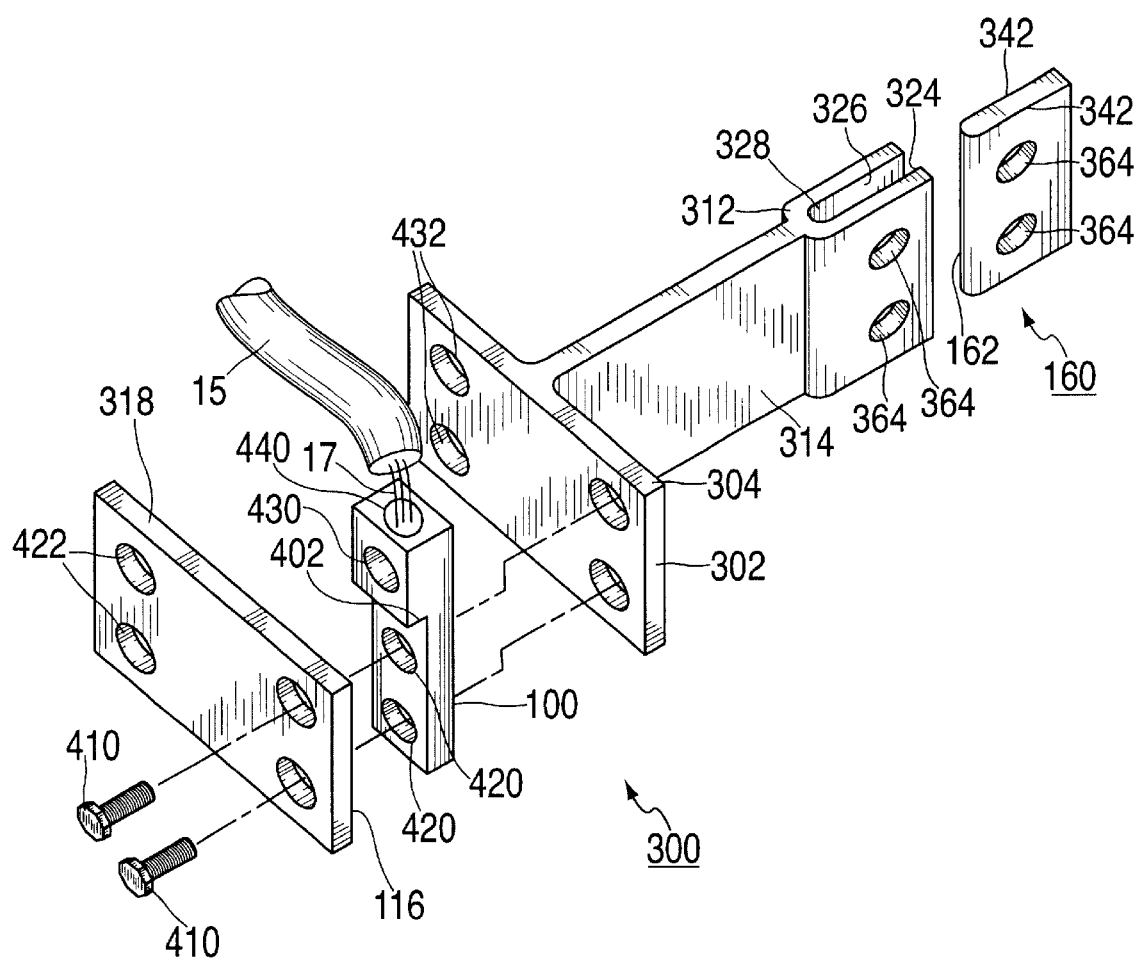
FIG. 7 is a front perspective view of a vertical bus power connector.

Turning to FIG. 7, the bus bar connector 300 is shown with a lug 100 and a section of a vertical bus bar 160. The U-shaped member 312 receives bus bar 160 such that legs 324, 326 are configured to form an inner portion 328 of U-shaped member 312, and allow an electrical connection with opposing sides 342 of bus bar 160. Furthermore, an interference fit between legs 324, 326 of U-shaped member 312 and bus bar 160 is further accomplished when a leading edge 162 of the bus bar 160 connecting to the U-shaped member 312 is tapered and received between legs 324, 326. As bus bar 160 is further inserted between legs 324, 326, an interference fit is created between bus bar 160 and legs 324, 326. Holes 364 disposed on bus bar 160 are aligned with holes 364 in U-shaped member 312 when bus bar 160 is fully inserted. Bolts, rivets, or the like are then placed through the holes 364 to secure bus bar 160 between legs 324, 326 of U-shaped member 312.

A lug 100 is depicted in FIG. 7 comprising at least one hole 420 at one end for fastening to either the base plate 302 or a face plate 116 of bus bar connector 300 and a threaded opening 430 at the other end to receive a set screw, or the like (not shown). Lug 100 further comprises an opening 440 perpendicular to the threaded opening 430 for electrically receiving a power cable conductor 17 and held in place with the set screw, or the like (not shown). A ledge 402 of lug 100 will rest on a ledge 318 of a face plate 116 or ledge 304 of base plate 302 to prevent twisting of the lug 100, thus limiting any short circuit potential. The lug may be flipped or turned 180 degrees so as to rest on opposite ledges of the above referenced elements to receive a power cable 15 from an opposite direction. The lug 100 is electrically connected to the base plate 302 of connector 300 with alignment of holes 420 of lug 100 and holes 432 of base plate 302. Bolts, rivets, or the like 410 are then placed through the aligned holes 420 and 432 to secure lug 100 to base plate 302.

The face plate 116 may be fastened with typically two threaded bolts 410 to the base plate 302 to cross brace at least one lug 100, which would reduce potential movement of a lug 100 that in turn could produce a short circuit if caused to contact another phase conductor. The face plate 116 having openings 422 aligned with the holes 420 of the lug 100 and holes 432 of base plate 302 is shown for attachment to the base plate 302 to offer cross brace support for the lug 100.

The flow of electrical current utilizing a vertical bus bar connector 300 is described with reference to FIG. 7. Electric current flows from incoming power cable 15 to power cable conductor 17 that is held in place with the set screw, or the like in opening 440 of lug 100. The electric current flows from lug 100 to base plate 302 by electrical connection utilizing aligned holes 432 on base plate 302 with holes 420 of lug 100. The electrical current translates from the base plate 302 to the legs 324, 326 of the U-shaped member, as connector 300 is substantially made of a one-piece electrically conductive material, such as copper. The electrical current flows from legs 324, 326 to bus bar 160 caused by an interference fit between legs 324, 326 disposed on either side of bus bar 160 and furthered with an alignment of holes 364 to permit bolting or riveting, or the like to secure an electrical connection.

The present invention eliminates the need for more expensive fasteners by minimizing the number of parts necessary to make a simple and strong connection between a power cable and a bus bar. Using the vertical bus bar connector is cost effective, as it is a single fastener and requires no special assembly tools to install in a motor control center, a switch board, or a switch gear assembly using standard bolt type hardware and is capable of withstanding higher amperages without disengaging. The nut and bolt fastening design of the connector 300 to both the bus bar 160 and the power cable conductor 17 via the lug 100 shown in FIG. 7 essentially eliminates the possibility of short circuiting between the three phases by a simple strong connection reducing the risk for a short circuit between the phases regardless of whether a phase barrier is utilized.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrical connector electrically connecting a bus bar to a power supply source comprising:
   a main body portion having a first end and a second end;
   a first end of a power supply wire operably coupled with said first end of said main body portion, while a second end of said wire is connected to the power supply source; and
   a U-shaped member attached to said second end of said main body including legs configured to be rigidly secured to the bus bar through which an electrical contact is made supplying electrical current from the power supply source to the bus bar.

2. The connector in claim 1 wherein a base is disposed substantially perpendicular to said first end of said main body portion and secured thereto.

3. The connector in claim 2 wherein at least one lug is connected to said base plate, said at least one lug electrically connected to said first end of said power supply wire.

4. The connector in claim 3 wherein said lug comprises one end having a threaded opening to receive a set screw for clamping a cable conductor to said lug and a cable opening substantially perpendicular to said threaded opening to receive said cable conductor and the other end having at least one opening aligned to correspond with at least one hole in at least one of said base plate and a face plate.

5. The connector in claim 4 wherein at one end of said lug is configured having an extending ledge for engagement with an edge of one of said base plate and said face plate wherein such engagement prevents twisting of said lug, and thus, short circuiting.

6. The connector in claim 3 wherein said base plate includes a face plate electrically connected to one of said base plate and said at least one lug.

7. The connector in claim 1 wherein said legs of said U-shaped member include openings disposed therethrough aligned with at least one corresponding opening in said bus bar for fastening together with, such as, a nut and bolt.

8. The connector in claim 7 wherein said bus bar is configured with a tapered leading edge that engages an interior portion of U-shaped member.

9. An electrical enclosure receiving electrical current comprising:
   a bus bar having at least one opening;
   a main body portion having a first end and a second end;
   a first end of a power supply wire operably coupled to said first end of said main body portion, while a second end of said wire is connected to a power supply source; and
   a U-shaped member attached to said second end of said main body including legs configured to be rigidly secured to the bus bar through which an electrical contact is made supplying electrical current from said power supply source to the bus bar and connected with at least one nut and bolt extending through at least one opening in legs of said U-shaped member corresponding and aligned with said at least one opening in said bus bar.

10. The electrical enclosure in claim 9 further comprising:
    a base plate is disposed substantially perpendicularly to said first end of said main body portion and having a hole disposed therein for receiving an attachment device securing at least one attachment device; and
    at least one lug electrically connected to said base plate, said at least one lug connected to said first end of a power supply wire.

11. The electrical enclosure in claim 10 wherein said base plate includes a face plate electrically connected to one of said base plate and said at least one lug.

12. The electrical enclosure in claim 11 wherein said lug comprises one end with a threaded opening to receive a set screw for clamping a cable conductor to said lug and a cable opening substantially perpendicular to said threaded opening to receive said cable conductor, the other end having at least one opening aligned to correspond for attachment to one of said base plate and said face plate, and said lug at said one end is configured having an extending ledge for engagement with an edge of one of said base plate and said face plate wherein such engagement prevents twisting of said lug, and thus, short circuiting.

13. The electrical enclosure in claim 9 wherein said bus bar is configured with a tapered leading edge that engages an interior portion of U-shaped member.

\* \* \* \* \*